United States Patent [19]

Bottiglieri et al.

[11] Patent Number: 5,335,228
[45] Date of Patent: Aug. 2, 1994

[54] SYNCHRONIZATION RELATED TO DATA STREAMS

[75] Inventors: Michael P. Bottiglieri, Wyckoff; Peter A. A. Dempsey, Morris Plains, both of N.J.

[73] Assignee: AT&T Bell Laboratories, Murray Hill, N.J.

[21] Appl. No.: 954,218

[22] Filed: Sep. 30, 1992

[51] Int. Cl.[5] .............................................. H04J 3/06
[52] U.S. Cl. ............................ 370/100.1; 370/110.1
[58] Field of Search ............... 370/100.1, 105.1, 105.4, 370/106, 107, 94.2, 105.2, 105.5, 110.1, 79, 82, 83, 99; 371/67.1; 375/114, 116, 31, 32, 112

[56] References Cited

U.S. PATENT DOCUMENTS

| | | | |
|---|---|---|---|
| 3,591,720 | 7/1971 | Othmer | 370/106 |
| 3,597,547 | 8/1971 | Roll | 370/106 |
| 3,798,378 | 3/1974 | Epstein | 370/106 |
| 3,970,798 | 7/1976 | Epenoy et al. | 370/83 |
| 4,517,669 | 5/1985 | Freeburg et al. | 370/94.2 |
| 4,617,657 | 10/1986 | Drynan et al. | 370/94.1 |
| 4,779,269 | 10/1988 | Bouillot et al. | 370/110.1 |
| 4,860,286 | 8/1989 | Forsberg et al. | 370/106 |
| 4,930,125 | 5/1990 | Bains | 370/105.1 |
| 4,984,236 | 1/1991 | Chopping et al. | 370/100.1 |

OTHER PUBLICATIONS

"Telecommunication Networks: Protocols, Modeling and Analysis" by Mischa Schwartz, Addison-Wesley Publishing Co. 1987, pp. 135-136.

"Transmission Systems for Communications" by Members of the Technical Staff, Bell Telephone Laboratories, 1982, pp. 659-666.

Primary Examiner—Douglas W. Olms
Assistant Examiner—Chau T. Nguyen
Attorney, Agent, or Firm—Ruloff F. Kip, Jr.

[57] ABSTRACT

A remote terminal for a subscriber loop carrier network operates by flow from one to another of units in the terminal of time division multiplexer data streams of binary valued digital bits. Each stream has the format of periodic frames of time slots of which each frame consists of (a) a service time slot containing only service bits, and (b) a plurality of customer slots which contain mostly bits coded with data from customers of the network, but which also include a less number of service bits. Each unit includes encoding means responsive to local synchronizing and clock pulses derived from data incoming to the unit to encode on each frame of the outgoing data stream synchronizing information consisting of (c) a synchronizing pattern comprising a coded sequence of service bits localized in the frame's service slot and (d) a spoiler pattern formed of service bits distributed over customer slots in the frame. The spoiler pattern is interrelated with the synchronizing pattern so that no fortuitous bit sequence occurring in the stream and including any bit beating customer data can falsely duplicate the synchronizing pattern. Each unit also includes decoding means responsive to the presence of synchronizing patterns in an incoming data stream to produce signals for synchronizing the operation of that unit with the pre-established timing of the incoming stream. Such units may be circuit cards having mounted thereon encoding and decoding means in the form of semiconductive integrated circuits and including binary counters used to implement the encoding and decoding functions.

12 Claims, 5 Drawing Sheets

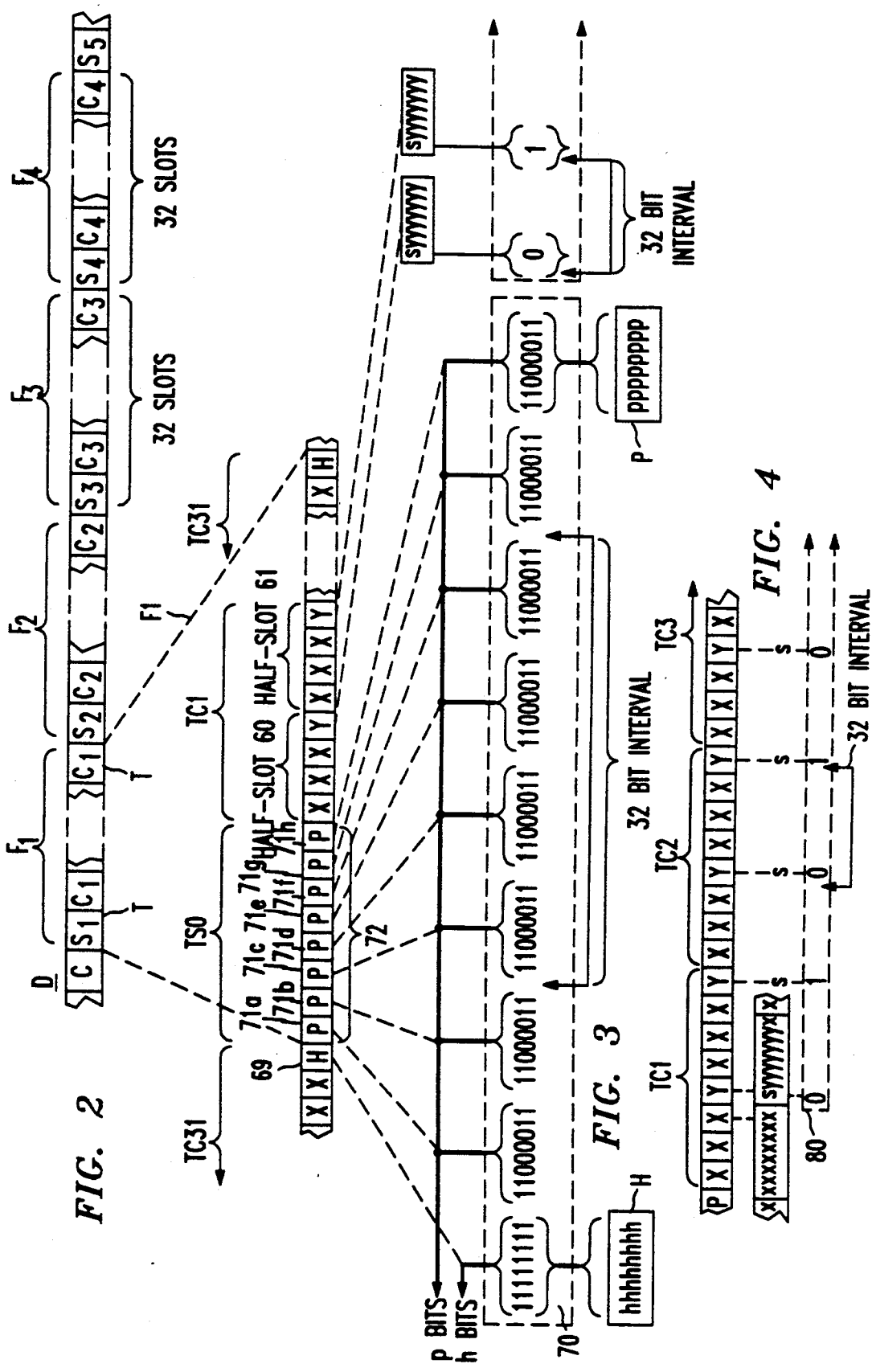

SYNCHRONIZATION RELATED TO DATA STREAMS

FIELD OF THE INVENTION

This invention relates to methods and apparatus for providing synchronization related to data streams utilized in telecommunications and comprising streams in time of binary-valued digital bits. More particularly, this invention relates to methods and apparatus of such kind wherein the information used for synchronizing purposes is self-contained within such streams.

BACKGROUND OF THE INVENTION

A synchronizing technique used with data streams with periodically recurring bits and equal length bytes is to provide a fixed start of frame pattern and insert into certain of these bytes as required additional "stuffing" bits to prevent the payload from reproducing the synchronizing pattern. Disadvantages in the employment of that technique is that it introduces into the stream inequality of byte length and lack of periodicity in the rate of frame recurrence so as to possibly cause difficulties and adverse consequences downstream.

Another synchronizing technique is to generate at each of successive positions in the stream, separated by time intervals, a single localized synchronizing pattern constituted of the binary values of bits reserved for the pattern, the same pattern being produced at all such positions, and such pattern being distinctive and uncommon in character in relation to other bit patterns normally occurring in the stream. The disadvantage of such latter technique is that it fails to be wholly deterministic in its identification of information in the stream as being synchronizing information. That is so because, no matter how distinctive such synchronization pattern is, there is always, from the statistical viewpoint a finite probability that a sequence of bits in the stream including other than such reserved bits will generate a binary valued pattern not the true synchronization pattern but exactly duplicating it so as to be indistinguishable from it.

SUMMARY OF THE INVENTION

These and other disadvantages are overcome according to the invention in one of its aspects by methods and apparatus involving the generation in a data stream of periodically recurring bits of two different patterns used for synchronizing purposes. The first pattern is a "lumped" or localized synchronization pattern comprising synchronizing bits reserved for that pattern and occurring at successive positions in the stream separated from each other by intervening time intervals. The second pattern is a distributed spoiler pattern formed within those intervals by the binary values of "spoiler" bits reserved for that pattern and distributed over these intervals to be separated by bit intervals. The spoiler pattern is interrelated with the synchronization pattern in such manner that the presence in the stream of the "spoiler" bits prevents any sequence of bits occurring in the stream and including any bit other than one in such pattern from duplicating the synchronization pattern. Thus, the synchronization technique provided by the use of such two patterns is wholly deterministic in its identification of information in the stream as truly being synchronization information. Also, resort to that technique permits the self containment within the data stream of all information necessary for its synchronization on a wholly determined basis without introducing into the stream any inequality in byte length or lack of periodicity in frame recurrence.

BRIEF DESCRIPTION OF THE DRAWINGS

For a better understanding of the invention, reference is made to the following description of exemplary embodiments thereof and to the following drawings wherein:

FIGS. 2–4 are schematic diagrams of the format of such a data stream;

Figure 5:
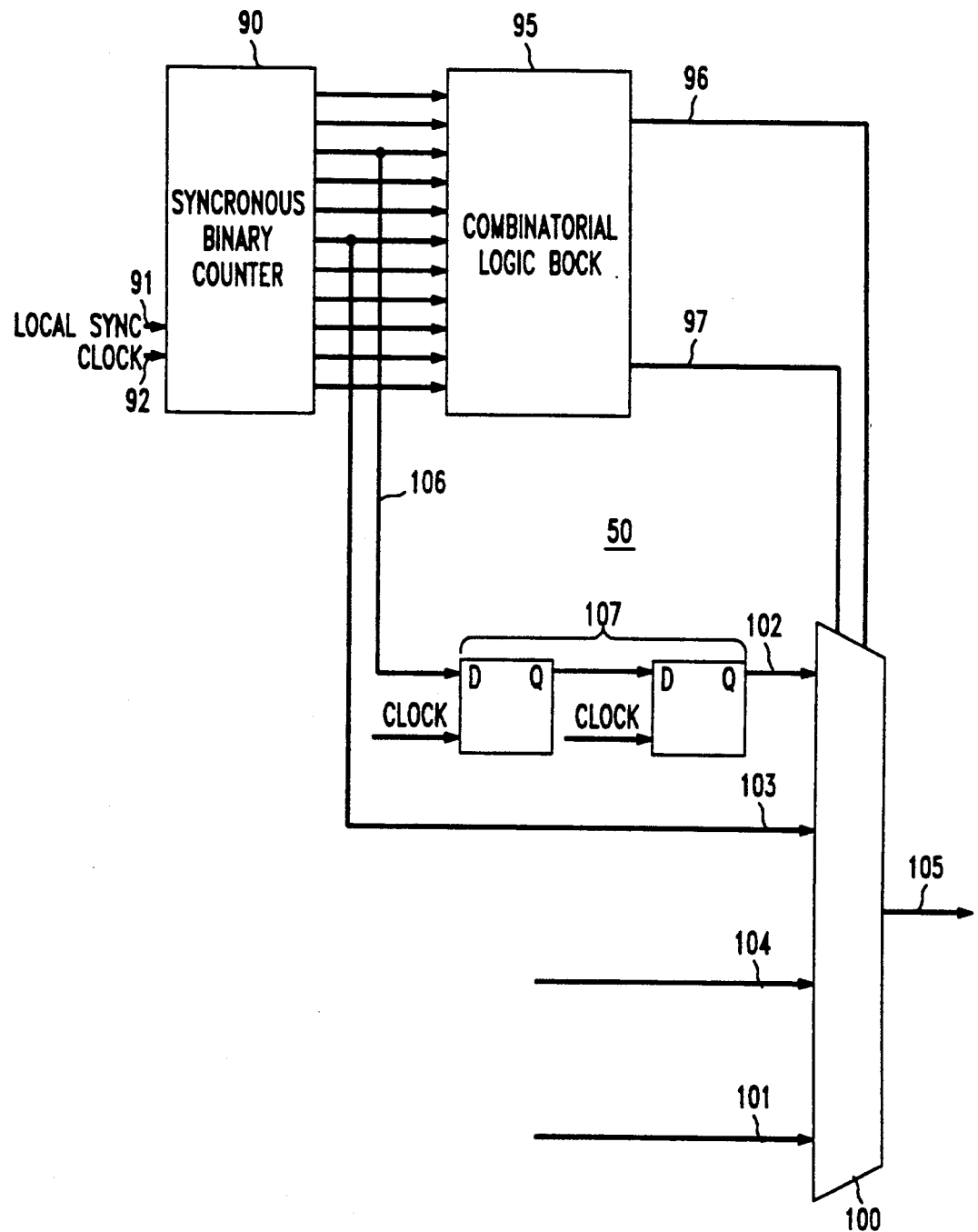
FIG. 5 is a block diagram of means for encoding synchronization information in the FIG. 2 data stream.
Figure 6:
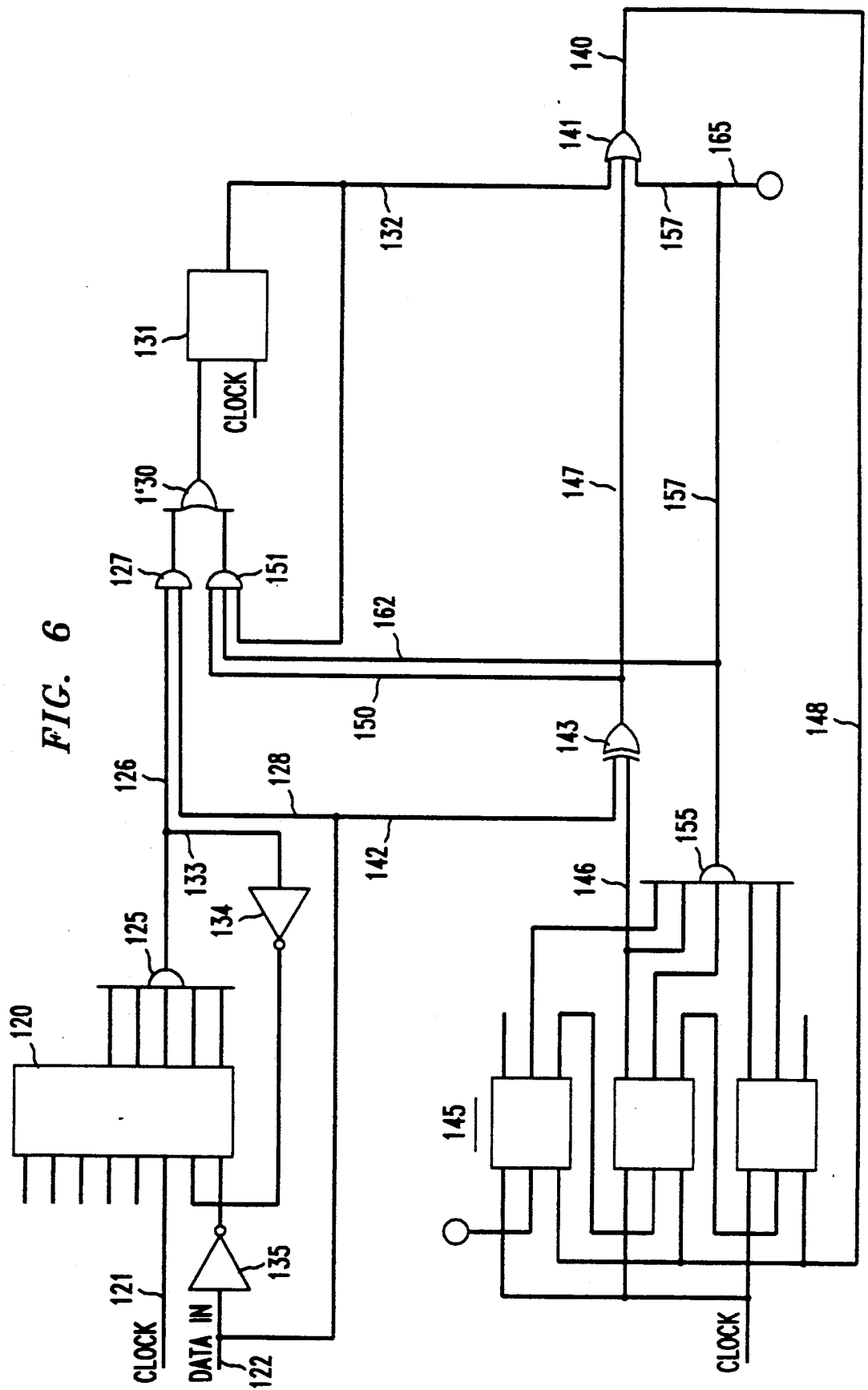
FIG. 6 is a block diagram of means for decoding such synchronizing information in the FIG. 2 data stream and deriving a synchronizing signal therefrom.

It should be noted that blocks shown in FIGS. 5 and 6 may, unless inconsistent with the following description, represent either discrete or integrated circuits as drawn or other program controlled means or instrumentalities.

It should further be noted that, in the following description, items which are counterparts of each other may be designated by reference characters with the same alphabetical or numerical prefix having different numerical or alphabetical or alphanumerical suffixes to differentiate such items and that, accordingly, a description of any one of such items shall, unless its context otherwise indicates, be taken as being equally applicable to any counterpart of such item.

DETAILED DESCRIPTION OF EXEMPLARY EMBODIMENT

Figure 1:
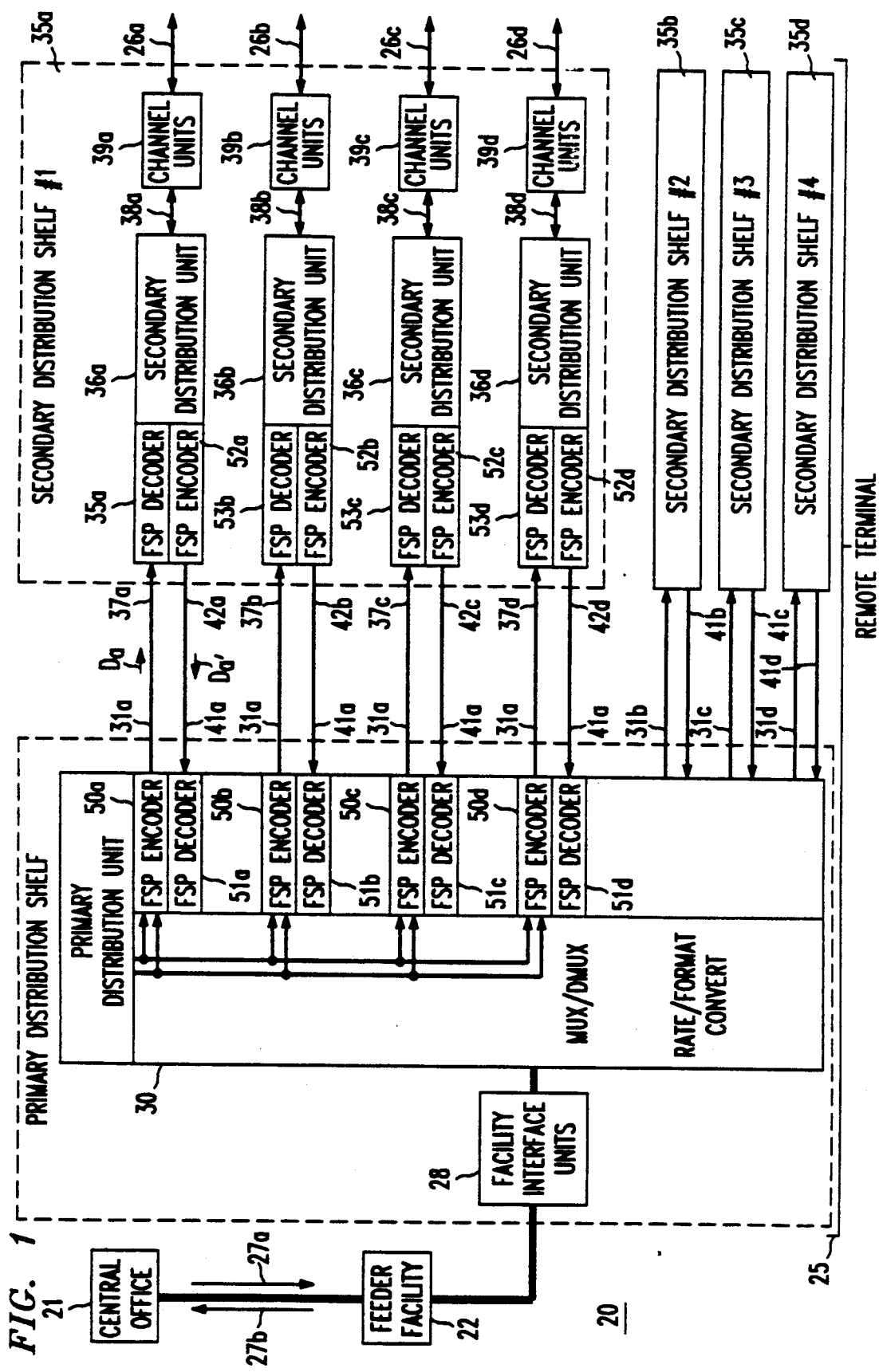
FIG. 1 is a block diagram of exemplary apparatus in which synchronization according to the invention is provided in relation to data streams occurring in the apparatus.

Referring now to FIG. 1, the reference numeral 20 designates a digital loop carrier transmission system forming part of a larger telephone network (not shown). Information originated by customers of the network is transmitted via facilities (not shown) to a central office 21 and is muted from there through a feeder facility 22, a remote terminal 25 and customer drops 26a–26d, for example, to customers served by that terminal. Similarly information originated by the last named customers is transmitted via those drops and through elements 25 and 26 to central office 21 to be muted by it to customers in other parts of the network. Thus, with regard to remote terminal 25, information from and to customers ("customer data") flows through it in both directions such that there is an exchange of information between it and central office 21 and, also, an exchange of information between terminal 25 and the various locations of the customers served by drops 26.

The exchange of information between units 21 and 25 is effected by way of two streams of information 27a and 27b incoming to and outgoing from terminal 25 and transmitted via facility 22 which may be a coaxial cable, fiber optic cable, microwave relay link or other suitable telecommunications transmission medium. The information streams 27 are digital data streams having a format conforming to industry standards.

Remote terminal 25 for purposes of internal communication employs data streams of different format than the format of the external data streams 27. To effect conversion between such external and internal streams, terminal 25 comprises data handling means in the form of facilities interface units 28 and a primary distribution unit 30. Units 28 serve as means for adapting the incoming data stream 27a to the particular mode of operation of terminal 21, and conversely with respect to such mode of operations and the outgoing stream 27b. Unit 30 performs the functions of time slot interchange ("TSI"), multiplexing and demultiplexing and rate format conversion.

The units 28 and 30 by their operations generate time division multiplexed streams of binary valued digital bits which are specific to the remote terminal 25 and which are generally designated herein as the data stream D. The stream D in terms of its format and direction of flow can be and is treated herein as a single stream. Physically speaking, however, the stream D has a plurality of physical copies thereof which, for left to fight flow of data, travel from primary distribution unit 30 via transmission facilities 31a–31d to a respectively corresponding plurality of data handling means in the form of secondary distribution units 36 on shelves 35a–35d. Shelf 35a is exemplary of the rest, and, as shown (FIG. 1), it comprises four secondary distribution units 36a–36d each in the form of a circuit card often called a circuit pack. Those units 36a–36d are connected to primary unit 30 for left to fight data flow by facilities 31a consisting of four separate pairs of wires 37a–37d respective to those four secondary units. As exemplified by the left to right data stream $D_a$ represented by the arrow adjacent wire 37a, each of those wires carries separate left to right physical versions of data streams D.

Each of the cards 36a–36d is in turn interconnected by sets of wires 38a–38d (not individually shown) to respectively corresponding sets of channel units 39a–39d for transmission of data from each card 36 to its associated channel units, and conversely. Each such set of channel units may include up to twelve of such units in the form of circuit cards (i.e., circuit packs), and each such channel unit in one such set thereof may be connected to four respectively corresponding customer drops 26, any one of which constitutes a tip and ting telephone pair. Thus, a total of one hundred and ninety-two of such customer drops may extend out from each of the secondary distribution shelves 35a–35d.

The data streams flowing from primary unit 30 to secondary distribution shelves 35 are initially demultiplexed in the secondary distribution units in such shelves and are then further demultiplexed by the channel units connected in those shelves to the secondary distribution units. The overall effect of the functioning in each such shelf of its secondary distribution units and channel units on left-to-right moving data is that each original high bit rate time division multiplex data stream incoming to each shelf 35 is convened therein to a multiplicity of baseline telephone signals appearing on the tip and ting wire pairs constituting the customer drops terminating at that shelf, and which baseline signals may be analog or digital but are of the kind normally impressed on such wire pairs leading to telephone subscribers' stations. Conversely, with regard to right to left flowing customer data incoming from such stations to remote terminal 25, the data originally provided by the baseline telephone signals is multiplexed up within the shelves 35, first by their channel units and, again, by their secondary distribution units so as to combine all such information into high bit rate data streams corresponding in format to data stream D but constituting separate physical streams flowing fight to left from shelves 35a–35d to primary unit 30 via transmission facilities 41a–41d. Such facilities are exemplified by facility 41a consisting of four separate wires 42a–42d respectively connecting units 36a–36d in shelf 35 to the primary unit 30. All wires in facilities 41a–41d carry right-to-left moving data streams which in format all duplicate the genetic data stream D, and which moving streams are exemplified by the data stream $D'_a$ represented by the arrow adjacent wire 42a.

As so far described, the remote terminal 25 is, in general, already known. The terminal 25 differs, however, from previous terminals by the inclusion in terminal 25 of encoders and decoders for the data streams moving between primary distribution unit 30 and the secondary distribution units on shelves 35.

Specifically, the primary unit 30 incorporates therein encoders 50 respectively corresponding to the wire facilities 31 by which physical data streams exemplified by the stream $D_a$ are transmitted from unit 30 to the secondary units on shelves 35. Also, the primary unit 30 incorporates therein decoders 51 respectively corresponding to the wire facilities 41 by which physical data streams exemplified by the stream $D'_a$ are transmitted from the secondary units on shelves 35 to unit 30. Exemplary ones of such encoders and decoders are the encoders 50a–50d and the decoders 51a–51d which are associated with, respectively, the wires 37a–37d and the wires 42a–42b. Each encoder 50 and decoder 51 may comprise a semiconductive integrated circuit mounted on a circuit card respective to that encoder and decoder and inserted into terminal 25 to function as part of unit 30. As shown in FIG. 1, each of the encoders 50 is adapted to receive local synchronizing signals and local clock signals provided to those encoders by, respectively, leads 55 and 56 and derived in unit 30 from the incoming data stream 27a.

The secondary distribution units on shelves 35 incorporate therein respective encoders 52 respectively corresponding to the set of wire facilities 41 by which data streams exemplified by the stream $D'_a$ are transmitted from those secondary units to primary unit 30. Further, such secondary units incorporate respective decoders 53 respectively corresponding to the wires facilities 31 by which data streams exemplified by the stream $D_a$ are transmitted from primary unit 30 to those secondary units. Exemplary ones of the latter encoders and decoders are the encoders 52a–52d and the decoders 53a–53d which are incorporated in, respectively, the secondary distribution units 36a–36d on shelf 35a and which are associated with, respectively, the wires 42a–42d and the wires 37a–37d. Encoder 52a is exemplary of all the encoders 52 in that encoder 52a is adapted to receive local synchronizing signals and local clock signals provided by, respectively, the leads 57a and 58a and derived by processing by the circuitry on the secondary distribution card 36a of the data incoming thereto from the channel unit cards 39a.

Referring now to FIGS. 2–4, those figures illustrate the format of the data stream D which is genetic to the physical data streams $D_a$ and $D'_a$ shown on FIG. 1 and to all other physical data streams outgoing from unit 30 to shelves 35 or incoming to unit 30 from those shelves.

The data stream D is a time division multiplex data stream constituted (FIG. 2) of periodically recurring consecutive binary bits and having the format of periodically recurring time frames F of time slots generally designated as slots T. While only frames $F_1$–$F_4$ are shown, the frames F may be of any number within practical bounds. All of frames F are of the same format and length, with the first slots of the frames being service slots designated in FIG. 2 as slots S, and with the remainder of the slots in the frames being "customer" slots designated in FIG. 2 as slots C. In each frame F there is one service slot S and thirty-one customer slots C to make up thirty-two slots in all. In such connection, it is to be noted that, while a frame contains thirty-two slots, the first slot S is given a "zero" position designation so that the last slot is designated, in terms of position, as the 31st slot rather than the 32nd slot.

FIG. 3 enlarges upon the slot frame $F_1$ and some of the slots therein. In FIG. 3, the first slot in the frame is designated as slot TS0 because it is a slot T, is also a service slot S and occupies the "zero" position in the frame. Similarly, the second slot in the frame is designated TC1 because it is a slot T, is a customer slot C and occupies the "first" position in the frame from the viewpoint of the terminology of binary numbers. The last slot in frame F1 is a customer slot designated TC31.

Time slot TS0 consists of eight P bytes each in turn consisting of eight $\underline{p}$ bits. All of the $\underline{p}$ bits are service bits in the sense that the information represented thereby does not come from network customers. These $\underline{p}$ bits are also synchronizing bits and reserved bits in the sense that they are set apart for incorporation in the synchronization pattern soon to be described. Since them are eight P bytes and eight $\underline{p}$ bits in each P byte, the service slot TS0 contains 64 bits in all. All the other service slots TS0 in data stream D have the same format as the one just described.

Turning now to the slot TC1, this customer slot is divided into leading and lagging half slots 60 and 61 which are of the same format in that each consists of three X bytes followed by a Y byte. Each X byte consists of eight customer $\underline{x}$ bits (FIG. 4) carrying information which is derived from network customers and which is, accordingly, unpredictable so as to make unpredictable the binary values of the $\underline{x}$ bits. Each Y byte consists of eight bits of which the first is an $\underline{s}$ service which is a reserved bit in that it is set apart to be included in a spoiler pattern to be described. Because reserved for that pattern, the $\underline{s}$ bits are called spoiler bits. The remaining seven $\underline{y}$ bits in each Y byte are service bits utilized in terminal 25 to further the performance of "housekeeping" functions (i.e., to guide and aid in the performance of various internal operations of the terminal). Because the $\underline{y}$ service bits have such role their binary values are unpredictable.

From what has been said, it will be clear that customer time slot TC1 of frame F1 consists of 64 bits which are mostly customer bits but which include a lesser number of service bits. All of the other time slots in data stream D which are customer slots have the same format as the discussed time slot TC1 except for the time slots TC31 in stream D.

The time slots TC31 differ from the other customer slots in stream D in that, in each time slot TC31, the last byte 69 (which is an H service byte) does not have the bit format syyyyyyy which is shown for the Y service bytes of the other customer time slots in stream D. Instead, each H service byte consists of eight header or $\underline{h}$ bits which are service bits but are reserved bits in that they are set apart to be included in the synchronization pattern. In such connection, it will be noted that the H byte of the time slot TC31 in the frame before frame F1 is a byte which is immediately before and continuous with the time slot TS0 in frame F1 containing the $\underline{p}$ bits to be included in the synchronization pattern. Anywhere else in stream D, a TS0 time slot will be immediately preceded by an H byte in the TC31 slot before that TS0 slot. Thus, the header or $\underline{h}$ bits in any H byte can be and are included in a synchronization pattern occupying that H byte and the ensuing TS0 slot.

Turning to that synchronization pattern itself, an exemplary pattern 70 according to the invention is shown in FIG. 3, such pattern comprising in the TS0 slot of Frame 1 a sequence 72 of eight P bytes 71a–71h in which the eight synchronizing $\underline{p}$ bits in each P byte have the binary values "11000011." That is, such code "11000011" is repeated eight times in slot TS0. The exemplary pattern 70 also includes at its start the eight header bits $\underline{h}$ included within the H byte 69 and of which the binary values are "11111111."

The pattern 70 just described is only one of a substantial number of patterns which can be used for synchronizing purposes according to the invention. All of such patterns are, however, the same with regard to certain aspects as follows. First, assuming that the synchronizing pattern is to be used in a data stream consisting of consecutive frames F of the same format and each consisting of (a) an initial service time slot containing 2 m bits where $\underline{m}$ is an integer, and (b) subsequent customer time slots each containing 2 m bits, such synchronizing pattern comprises a sequence of 2 m synchronizing bits all within such an initial service slot. Second, considering the binary values of the bits in that sequence, each pair of bits therein which is separated by an interval of $\underline{m}$ bits will have respective binary values forming a pair of values having a feature common to that pair of values and every other pair of values provided by the respective binary values of every other pair of bits in that sequence which are separated by an interval of $\underline{m}$ bits. In that connection, when it is said that earlier and later bits are separated by an $\underline{m}$ bit interval, the interval in question starts immediately before the earlier bit but ends immediately before the later bit. That is, in an interval of $(\underline{m}+1)$ bit length is required to span both the earlier and the later bit.

To illustrate the foregoing by pattern 70, that pattern is characterized by both of the aspects just discussed as follows. In pattern 70, $\underline{m}$ has a value of 32 so that the pattern's sequence of synchronizing bits in slot TS0 has a length of 2 m bits (i.e., 64 bits). Further in the bit sequence of pattern 70 contained within slot TS0, each pair of bits separated by an interval of 32 bits have respective binary values providing a pair of values which is either "11" or "00."

In either case, the two values in each pair are matching values, and it is that matching of values which is the common feature of each pair of bits in slot TS0 separated by a 32 bit interval.

The mentioned common feature of those bit pairs need not, however, be matching values. To illustrate, another sequence of bits in slot TS0 suitable for use in the synchronizing pattern can be formed by retaining for the first four bytes 71a–71d, the code "11000011" shown in FIG. 3 but by reversing the binary values of the bits in the last four bytes 71e–71h so that each of such latter bytes is of the form "00111100." With such sequence, the respective values of all pairs of bits in the sequence which are separated by a 32 bit interval will be "10" or "01." Those paired values "10" and "01" are, while different permutations of values, non-matching values in each case, and they are also the same combination of values as distinct from the previously discussed value pairs "00" and "11" which are different combinations of values.

As another consideration, while the synchronization pattern 70 has been described as including a header byte 69 at its start, and while them are advantages in having such a header, the synchronization pattern can do without a header byte so as to be constituted solely of the bit sequence contained within the slot TS0. An example of such a synchronization pattern is one in which in slot TS0 the first four bytes 71a–71d each have the form "11111111" and the second four bytes 71e–71f each have the form "00000000." In that "headerless" pattern, all pairs of bits separated by a 32 bit interval have respective binary values which are non-matching, and which form the value permutation "10." Thus, for that pattern, it can be said that the feature common to all such pairs of bits is that they have non-matching value or alternatively, that they are all characterized by the same value permutation "10."

The data stream D includes therein not only a synchronizing pattern but also a spoiler pattern 80 (FIG. 4) now to be described in detail.

Pattern 80 is provided by the s service bits which are reserved for that pattern and which are the first bits in the Y service bytes appearing as the end bytes in each of the two half slots in each of slots TC1 through TC30 and as the end byte in the first half slot in slot TC31. Where synchronization pattern 80 is headerless or otherwise does not include the first h bit in the H byte in slot TC31, the spoiler pattern 80 includes that h bit in each frame F in the data stream. From the description already given, it will be evident that adjacent s bits are separated from each other by an interval of 32 bits (i.e., m bits where m is 32) or, in other words, are separated by the same bit interval as separates the earlier discussed common-featured pair of bits in the sequence in slot TS0 of the synchronization pattern 70.

The bits just discussed have respective binary values imparted thereto to generate over the sequence of those bits a binary value spoiler pattern 80 which is interrelated in a particular manner with the binary value synchronization pattern 80.

As a first general rule or aspect of that particular relationship, the respective values of each two adjacent s bits in pattern 80 constitute two bit values which fail to duplicate a preselected feature which is common to the respective binary values of all the pairs of bits in synchronization pattern sequence 72 which are separated by the same bit intervals in that sequence as are the s bits in pattern 80.

To illustrate the foregoing by an example, the respective values of these pairs of bits in sequence 72 are either "11" or "00" so as in either case to be matching values. On the other hand, in the spoiler pattern 80 shown in FIG. 4, the respective values of each two adjacent pairs of bits in the pattern are either "01" or "10" to be in either case non-matching values. Thus, with regard to these values of each two adjacent bits in spoiler pattern 80, such values fail to duplicate the common feature of matching values of all the mentioned pairs of bits in synchronization pattern sequence 72.

As another example of the first general rule stated above, assume that the synchronization pattern sequence 72 consists as earlier described of four bytes each of the form "11000011" followed by four bytes of the form "00111100," and that, in the spoiler pattern 80, all of the s bits have either the value "0" or the value "1." Then, the first general rule is satisfied because, in synchronization pattern 72, all pairs of bits separated by 32 bits intervals have non-matching values whereas all s-bits in pattern 80 separated by 32 bit intervals have matching values.

As still another example of such first rule, assume that the synchronization pattern sequence 72 consists, as earlier described of four bytes each of the form "11111111" followed by four bytes each of the form "00000000." In such circumstance all pairs of bits in sequence 72 separated by 32 intervals have respective values "10" so as to provide the common feature of non-matching values. The rule will then be satisfied, if the s bits in pattern 80 are either all "0" or are all "1" so that each two s bits separated by a 32 bit interval have matching values. As another possibility, however, one can also select, as the common feature of all of such pairs of bits in sequence 72, that the values of each bit pair form the value permutation 10. Then in order for the first rule to be satisfied, it is required that no two adjacent "s" bits in pattern 80 exhibit such permutation of values, and this can be done by making all "s" bits "0" or by making them all "1" or, alternatively, by imposing on the first s bit in slot TC1 a "0" value and imposing a value of "1" on all other bits in the spoiler pattern.

The significance of relating the spoiler pattern 80 to the synchronizing pattern sequence 72 in such manner that the described first rule is obeyed is that, considering any fortuitous sequence of consecutive bits formed in stream D and consisting largely of customer bits but including two adjacent s bits of spoiler pattern 80, separated by a 32 bit interval, it is impossible for that sequence to fully duplicate the synchronization pattern sequence 72 because the values of those two s bits fails to duplicate the preselected feature common to all pairs of bits in pattern 72 separated by 32 bit intervals. In other words, while the customer bits in that fortuitous sequence may have their values come very close to duplicating the synchronizing pattern sequence 72, that fortuitous sequence cannot do so fully because of the presence in it of those two adjacent s bits. That is, the presence of such s bits in the fortuitous sequence preclude it from falsely mimicking the synchronization pattern 72 and thus are properly called "spoiler" bits.

In order, however, to assure that the synchronization pattern 72 can never be falsely duplicated in data stream D, it is not enough that the interrelation between synchronization pattern 72 and spoiler pattern 80 satisfy the first rule which has been discussed. In addition, it should satisfy a second rule which is that in the regions in stream D to the front and back of synchronizing pattern 70 the spoiler pattern should have a proper fit in its binary values with the synchronizing pattern 70 so that a fortuitous bit sequence which is generated in stream D and is 64 bits long but includes no s bits or only one s bit of spoiler pattern 80 will nonetheless be precluded from duplicating the synchronization pattern 80.

Such second rule is satisfied by the patterns 70 and 80 shown in FIGS. 3 and 4 in a manner as follows. The first "s" bit in slot TC1 in pattern 80 has a value of "0" and is separated by a 32 bit interval from a p bit in synchronizing pattern sequence 72 having a value of 1. Hence, the "0" value for that "s" bit prevents any 64 bit fortuitous sequence spanning both that s bit and that "p" bit from duplicating any of eight byes of "11000011" in synchronizing pattern 80. At the other lagging end of pattern 80 in slot TC31, the first header bit $\underline{h}$ in byte H has a value of "1" and follows an "$\underline{s}$" bit in that slot having a value of "0." Thus, the alteration in pattern 80 of "0" value and of "1" value for, respectively, the first and second reserved service bits in each customer slot is, in effect, carried all the way through slot TC31 so as to preclude any fortuitous bit sequence including both that "$\underline{h}$" bit and that "$\underline{s}$" bit from duplicating the synchronization pattern.

In the case of the particular synchronous and spoiler patterns 70 and 80, which are depicted in FIGS. 3 and 4, it can be shown that at least three header bits each of value "1" must immediately precede the synchronizing pattern sequence 72 in order to assure that such sequence can never be fully duplicated by a fortuitous bit sequence generated in stream D. In other cases, however, that result can be obtained without the use of any header bits. Specifically, if, as earlier described, the synchronizing pattern 80 is headerless so as to be only the bit sequence 72 consisting of an initial four bytes of the form "11111111" and a subsequent four bytes of the form "00000000" and, further, the spoiler pattern includes the first $\underline{h}$ bit in byte H in slot TC31, and that $\underline{h}$ bit as well as all the $\underline{s}$ bits in pattern 80 have a value of "1," then the interrelationship of the patterns 70 and 80 satisfies both of the discussed first and second rules so as to prevent at all times the full duplication of the synchronization pattern 80 by any bit sequence fortuitously generated in the data stream. To put it another way, according to the invention the synchronization and spoiler patterns are so interrelated that any bit sequence present in stream D which includes any customer bit cannot possibly fully duplicate the synchronization pattern.

While, as stated, a large variety of synchronizing patterns and interrelated spoiler patterns can be utilized for synchronizing purposes according to the invention, some patterns are more suited than others in economizing on the circuitry needed to encode the patterns into the data stream D and to decode the synchronizing patterns from that data stream. The synchronizing and spoiler patterns 70 and 80 shown in FIGS. 3 and 4 are well suited to realize that end.

That is, such patterns 70 and 80 can be readily encoded on and decoded from physical data streams corresponding to stream D by economical circuitry as follows:

FIG. 5 shows circuitry which may be the encoder 50a shown in FIG. 1 for encoding the patterns 70 and 80 on data stream $D_a$, but which circuitry is also usable for all the other encoders shown in FIG. 1. Hence that circuitry will be referred to in FIG. 5 as encoder 50.

The encoder 50 comprises an 11-stage binary counter 90 which responds to local synchronization pulses on lead 55. Those pulses are generated in primary distribution unit 30 to be synchronous with stream $D_a$ as it exists prior to having patterns 70 and 80 encoded thereon. Counter 90 counts clock pulses on lead 56 derived from that stream, up to 2048 pulses, and then automatically resets.

The counter outputs Q0, Q1, Q2, and Q3, Q4, Q5 and Q6–Q10 form three groups of outputs which are fed to a combinational logic block 95 to provide running indications in the block of the time intervals occupied by respectively, the bits in each byte in the data stream, the bytes in each time slot in such stream, and the time slots in each 2048 bit frame in the stream. Signals controlled by such indications of such time intervals appear on two leads 96 and 97 from block 95 to a multiplexer 100 receiving as a first input on lead 101 the data stream $D_a$ prior to patterns 70 and 80 being encoded thereon, and receiving also three second inputs on, respectively, leads 102, 103, 104 coupled to counter 90. Multiplexer 100 is controlled in its operation by the signals on leads 96, 97 to pass unchanged through the multiplexer to its output 105 the bits in stream $D_a$ on lead 101 or, alternatively, to pass to such output, during the time intervals scheduled for occupancy in the stream of the reserved bits of patterns 70 and 80, the appropriate ones of such bits on one of leads 102, 103, 104 to thereby generate those patterns in the stream leaving the multiplexer.

The input to multiplexer 100 on lead 102 is derived from output Q2 of counter 90 and is originally in the form of the sequence 00001111 . . . with respect to bit "zero" of a byte. That original output is passed from Q2 on lead 106 through a two stage shift register 107 to change the sequence to "11000011" with respect to that zero bit. That latter sequence is then repetitively introduced eight times by multiplexer 100 into the TS0 time slot of the data stream.

The spoiler pattern input on lead 103 is fed into multiplexer 100 directly from the Q5 output of counter 90. The bits in that output will have a "0" and a "1" value at, respectively, the twenty-fourth and fifty-sixth bit position time intervals in any time slot in the data stream. Therefore, the ones of these bits which are selected by multiplexer 100 (under control of the signals on leads 96 and 97) to be added to the data stream will have the proper binary values to generate the spoiler pattern 80 in that stream.

Finally, the input on lead 104 which is used to produce in the output stream from the multiplexer the header bits $\underline{h}$ is merely a constant power supply voltage. The operation of the multiplexer converts that voltage into the eight header bits of value "1" in the H byte of the output stream.

When the synchronization pattern used is the already described headerless pattern contained entirely within slot TS0 and consisting of a first four bytes coded "11111111" and a following four bytes coded "00000000", that synchronizing pattern can be generated by utilizing the time sequence of bits appearing at the output Q5 of counter 90, inverting by an appropriate circuit (not shown) the binary value of each bit in the sequence at such output, and applying the resulting sequence with inverted values to lead 102. Moreover, when that particular synchronization pattern is used, the corresponding spoiler pattern consisting entirely of "1" bits can be produced in the same way as that just described for producing the $\underline{h}$ header bits $\underline{h}$ for the pattern 70.

Turning now to the matter of decoding the synchronization pattern from say the data stream $D'_a$ incoming to the primary distribution unit 30, FIG. 6 shows circuitry which may be considered to be that of the decoder 51a shown in FIG. 1 but which may also be used for all the other decoders shown in that figure. Hence, in FIG. 6, that circuitry will be designated as decoder 51.

In the decoder 51, the counter 120 counts clock pulses on lead 121 derived from the data stream $D'_a$ as long as the bits in that stream on lead 122 and corresponding timewise with these pulses are bits having a value of "1". When there appears on lead 122 nine consecutive "1"s, that occurrence is detected by an AND circuit 125 to cause the output from the circuit 125 to go high on lead 126 connected to a second AND circuit 127. If the next data bit is a "1", that data bit, supplied via lead 128 to AND count 127, cooperates with the high signal on lead 126 to produce at the output of AND circuit 127 an output pulse fed through OR circuit 130 to a latched flip-flop 131 which is triggered by that pulse to an "on" state causing the production lead 132 from the flip-flop of a held enable signal of "high" level.

If, after the occurrence of the tenth data bit of "1" value, there are more "1"s in the data stream, they are prevented from being counted by a "stop counting" signal fed via lead 133 from the output of AND circuit 125 and then through an inverter 134, to an input to counter 120, but the counter is not thereby reset. If however, a "0" bit occurs in the data stream on lead 122, the "0" bit will be inverted by inverter 135 to cause the counter 120 to be reset.

With the enable signal level on lead 132 at "high", the enable signal has the effect of removing a high level for a reset and count signal (the "reset count" signal) appearing on an output lead 140 of an OR gate 141. Assuming that the shown counter 145 has been reset to zero, the removal of that high permits counter 145 to start counting clock pulses supplied to input thereto via leads 121 and 144, and the counter 145 continues to do so provided that the bits in the data stream D′$_a$ as they appear on lead 142 to XOR gate 143 matches the bits which are generated at the C02 output of the binary counter 145, and which latter bits are fed via lead 146 as another input to the XOR gate 143. As long as such matching occurs, the reset count signal on lead 140 remains low to enable counter 145 to keep counting. When, however, there is a mismatch, the occurrence of same is indicated by the development of a reset signal on lead 147 extending from the output of XOR gate 143 to an input of OR gate 141. The result of the generation of such reset signal is that the reset count signal goes high, and that high signal is fed via lead 140 to an input of counter 145 to reset the counter and prevent it from starting to count again until that "high" is removed. Also the reset signal is fed via lead 150 to an AND circuit 151 to clear the enable signal on lead 132 provided that the last received 10 bits from stream D′$_a$ were not all "1"s.

It may be, however, that no such mismatch occurs over the time interval in which the counter 145 has counted 62 bits. The lack of occurrence of that mismatch indicates that decoder 51 has detected in the data stream D′$_a$ the full synchronization pattern 70. When counter 145 reaches a count of 62 bits with no intervening mismatch, there is produced by an AND circuit 155, connected to selected outputs of the counter, a synchronizing signal which appears on output lead 156 from the AND circuit and which synchronizing signal goes "high". That synchronizing signal is fed via lead 157 to OR circuit 141 to cause the reset count signal on lead 140 to go high. That high signal is applied via lead 140 to counter 145 to reset that counter and to prevent it from starting to count again until at least ten consecutive 1's again appear in the data stream to cause counter 120 and its associated circuits to again produce on lead 132 a high level for the enable signal. The same synchronizing signal is applied via lead 161 to an input of AND circuit 151, concurrently with the application via lead 162 to another input of circuits 151 of a feedback of the enable signal on lead 132, to thereby drive flip-flop 131 to its "off" state and cause the enable signal on lead 132 to go low. The synchronization signal itself appears on lead 165 as an output from decoder 51, and that synchronous signal output is utilized to keep various of the operations occurring in the primary distribution unit 30 in synchronism with the already established timing of the data stream D′$_a$.

The FIG. 6 decoder circuit may be modified to detect (and produce such a synchronization signal in response to detection of) the mentioned headerless pattern consisting of a first four "11111111" bytes and a second four "00000000" bytes by merely changing counter 120 and its associated circuits to produce on lead 132 a high level for the enable signal upon the detection in the data stream of at least thirty-two consecutive "1" bits, and by having the lead 146 from counter 145 connected to an output thereof which will generate thirty-two consecutive "0" bits in response to the counting by counter 145 of the clock pulses on lead 144.

Each encoder 52 carried by one of the circuit cards 36 on the shelves 35 has an operation like that described above for encoder 50 in that such encoder 52 receives synchronizing and clock pulses produced locally on the card (as derivatives of its processing of the data incoming thereto from its associated channel unit cards 39), and is responsive to those local synchronizing and clock pulses to generate the described synchronizing and spoiler patterns 70 and 80 in the data stream D′$_a$ outgoing from that card to the primary distribution unit 30. Similarly, each decoder 53 carded by one of those circuit cards has an operation like that described above for decoder 51 in that such decoder 53 responds only to the presence of a synchronizing pattern 70 in the data stream D$_a$ incoming from unit 30 to that card to generate a synchronizing pulse utilized for synchronizing the operations occurring on that card with the already established timing of that data stream D$_a$.

It will be evident from the foregoing description that all the physical data streams D$_a$ and D′$_a$ flowing, respectively, from unit 30 to the cards 36 on shelves 35 and from those cards to unit 30 are data streams which each contains within itself all the information needed to synchronize the operations of circuitry receiving that stream with the pre-established timing of such stream. Accordingly, the incorporation of all that information in the stream itself, as described above, provides the advantage of making it possible to eliminate in the remote terminal 25 the multiplicity of wires which, absent the invention hereof, would be required in addition to the shown sets of wires 31 and 41 (FIG. 1) to transmit separately from the data streams the information necessary to synchronize the operations of unit 30 and cards 36 with the timing of the streams incoming thereto. A further advantage in the incorporation in a data stream of the combination of synchronizing and spoiler patterns which are interrelated as described are that such incorporation can be effected without any distortion in the format of the data stream with respect to byte length and rate of bit recurrence, and that such combination results in a wholly deterministic indication that information detected in the data stream is true synchronizing information.

A still further advantage in the use of an appropriate synchronization pattern of which exemplary ones have been described above the pattern can be decoded in such manner that, in the course of scanning the data stream, the synchronization pattern will never be missed. That is the decoding process can be carried out in a way such that it will not be misled by a false pattern in the data stream to the point where, by the time the falseness is discovered, it is too late to detect a nearby true synchronization pattern. Therefore this apparatus and method are fully re-entrant, guaranteeing the establishment of synchronization in a single frame.

As a case in point, note that, the slot TC31 in any frame precedes in the next frame the service slot TC0 containing all of the synchronizing pattern except its header, and that the 25th bit in such slot TC1 (i.e., the bit in the 24th bit position) is an s̲ spoiler bit always having a "0" value. Assume now that, starting with the customer bit following such s̲ bit, the data stream generates a fortuitous bit sequence duplicating the bits in the first part of the synchronizing patterns 70 present in the stream. That is, starting with that immediately following customer bit there is generated the fortuitous sequence which consists of one "11111111" code and of three subsequent "11000011" codes, and of which all binary values except the last "1" are provided by customer bits. That last "1" is provided by the first "h̲" bit in the H byte of slot TC31 and is, therefore, the first bit of the next synchronizing pattern occurring in the stream. That is such bit of the false pattern overlaps with the first bit of the true pattern. That first h̲ bit of "1" value is followed by two more h̲ bits of "1" value which still accord with the true pattern, but the next h̲ bit of "1" value fails to match the "0" value required for the synchronizing pattern as the value for the next following bit. Accordingly, the decoding circuit terminates its tracking of the false pattern previously generated. Because, however the binary counter in that circuit which counts the "1"s in the data stream is not at that time reset (inasmuch as such counter is reset only in response to the presence of a "0" in the stream), the decoding circuit as a whole is not reset but, rather, can continue with its tracking of the true synchronizing pattern to produce a synchronizing pulse at the proper time even though there was an overlap between the false pattern and the true pattern.

Still another advantage provided by the use of encoders and decoders of the kind described wherein, during encoding, the time sequence of bits from one of the outputs of a running binary counter is impressed on the data stream as the synchronization pattern and, during decoding, a time sequence of bits from the same numbered output of a binary counter is compared in the time domain with consecutive bits occurring in the data stream, is that such mode of decoding such a synchronization pattern is a technique which permits the bits in the stream to be compared seriatim for match or mismatch with the counter generated bits by only a single comparator stage in the course of seeking to detect the presence of the synchronization pattern. This ability to use such a single comparator stage for detecting such a pattern itself consisting of many bits stands in contrast to the technique wherein bits in the stream are compared in the spatial domain with a reference pattern of bits stored by the decoder, and wherein it is required to have many comparator stages.

Figure 7:
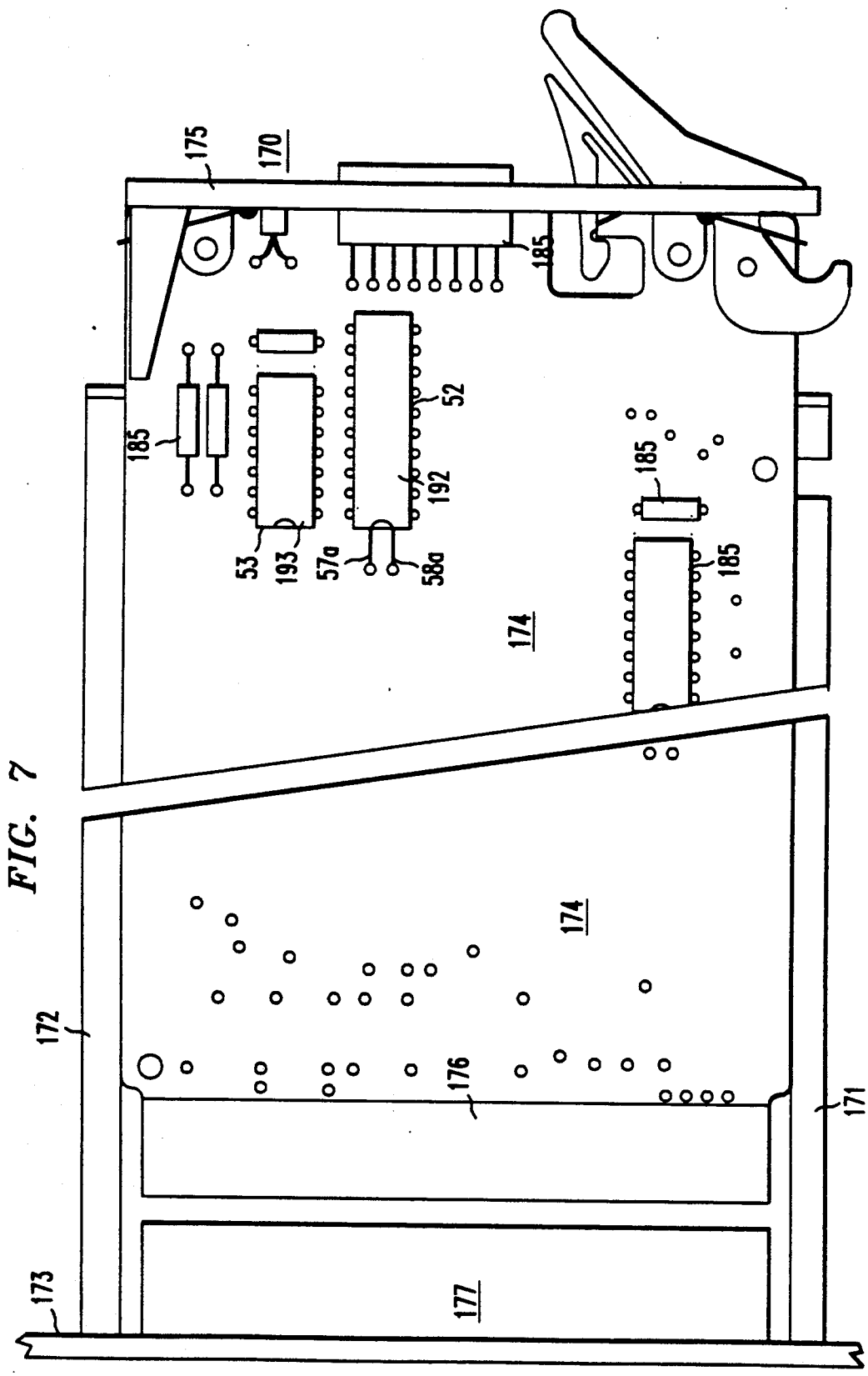
FIG. 7 is a front elevation of an exemplary circuit card for the FIG. 1 apparatus.

As stated, the secondary distribution units 36 (FIG. 1) are provided by circuit cards of which an exemplary one of such cards, designated as card 170, is shown in FIG. 7. Card 170 can be considered to be the card providing the secondary distribution unit 36a, but such shown card is typical of all the other circuit cards used in terminal 25 to provide secondary distribution units.

The card 170 is inserted into a bay of terminal 25 defined between lower and upper shelves 171 and 172 and bounded at its rear by a backplane 173. The card itself comprises an insulative board 174 and a plastic faceplate 175 at the front of the board. A rear section 176 of the board has thereon contacts (not shown) adapted upon full insertion of the card into the bay to be received in an edge connector 177 to make electrical contact therein with corresponding contacts (not shown) in the connector.

The card 170 has thereon circuitry 185 of which a few components are shown in FIG. 7 and which circuitry, when the card is in use, is electrically interconnected through edge connector 177 to the outside environment to, on the one hand, receive data from and transmit data to its associated channel units 39 (FIG. 1) and, on the other hand, receive the data stream $D_a$ from, and transmit the data stream $D'_a$ to, the primary distribution unit 30. That circuitry includes an encoder 52 and a decoder 53 which are substantially the same as the encoder and decoder of which the circuits are shown in FIGS. 5 and 6, respectively. Each of encoders 52 and 53 comprises respective semiconductive integrative circuits 192 and 193 mounted on board 174 to take their place along with the rest of the circuitry provided thereby. If preferred, encoder 52 and decoder 53 can be contained within a single semiconductive integrated circuit package. The circuitry 185 operates to encode synchronizing information on the outgoing data stream $D'_a$ and to decode synchronizing information in the incoming data stream $D_a$ so as to derive synchronizing signals therefrom, all as earlier described.

Further details on circuits cards appropriate for use as card 170 are obtainable from U.S. Pat. No. 4,991,062 issued Feb. 5, 1991, in the name of Kinhquoc Nguyenngoc for "EMI Reducing Circuit Card Apparatus", and assigned to the assignee hereof. Such patent is incorporated herein by reference and made a part hereof.

The above described embodiment being exemplary only, it is to be understood that additions thereto, omissions therefrom and modification thereof can be made without departing from the spirit of the invention and that accordingly the invention is not be be considered as limited save as is consonant with the recitals of the following claims.

We claim:

1. The improvement in apparatus comprising data handling means for receiving data, processing it and forwarding it as at least one time division multiplex data stream constituted of periodic consecutive binary bits and having the format of a plurality of periodic frames of time slots of which each frame comprises a service slot for only service bits and a plurality of customer slots for customer bits and a lesser number of service bits, said improvement comprising: encoding means operable on said stream to generate in each of said frames both a synchronizing pattern of reserved service bits comprising a sequence of synchronizing bits in said service slot and, also, a spoiler pattern of reserved service bits comprising spoiler bits in said customer slots, said spoiler pattern being interrelated with said synchronizing pattern to preclude any bit sequence present in said stream and including any customer bit from duplicating said synchronization pattern.

2. The improvement according to claim 1 in which said sequence of synchronizing bits consists of 2 m̲ bits where m̲ is an integer, each pair of bits in such sequence for which the two bits in each pair are separated by an m bit interval is a pair of bits of which the combination of their respective binary values has a feature in common with the combinations of values of all other of such bit pairs, and in which in said spoiler pattern each adjacent two of such spoiler bits have respective values so that such pair of values does not duplicate said common feature.

3. The improvement according to claim 2 in which said common feature is that each such pair of bits in said sequence of synchronizing bits have respective values which match each other, and in which each adjacent two spoiler bits in said spoiler pattern have non-matching values.

4. The improvement according to claim 3 in which said sequence of synchronizing bits corresponds in its bit values to a sequence of binary values respective to time sequential bits generated at one bit position in a set of multiple bit position binary number representations of a set of consecutive integers taken in order.

5. The improvement according to claim 1 in which said synchronizing pattern includes a header section disposed in said data stream prior to said sequence of synchronizing bits, said header section producing at the start of said synchronizing pattern a group of bits different in coding than any other group of bits in said synchronizing pattern.

6. The improvement according to claim 4 in which said synchronizing pattern includes a header section disposed in said data stream prior to said sequence of synchronizing bits, said header section producing at the start of said synchronizing pattern a group of bits different in coding than any other group of bits in said synchronizing pattern.

7. The improvement according to claim 1 in which said data handling means is a circuit pack.

8. The improvement according to claim 1 in which said data handling means receives a data stream which is separate from the aforesaid data stream forwarded by said data handling means, and which received data stream has the same format as said forwarded data stream so as to also include a synchronizing pattern and a spoiler pattern in each of a plurality of frames in such stream, and in which said improvement further comprises decoding means responsive to and only to the presence in said received data stream of the entirety of the last named synchronizing pattern to produce a synchronizing signal.

9. The improvement according to claim 8 in which said decoding means is provided by a circuit pack.

10. The improvement in a remote terminal comprising a primary distribution unit for exchanging information with a central office, a plurality of secondary distribution units for exchanging information with telephone sets of customers at remote locations from said terminal, and information transfer facilities interconnecting said primary unit and secondary units to implement exchange of information through said primary unit and secondary units between said central office and said telephone sets via first time division multiplex data streams transmitted from said primary unit to each of said secondary units, and via second time division multiplex data streams transmitted from each of said secondary units to said primary unit, each of said time division multiplex data streams being constituted of periodic consecutive binary bits and having the format of a plurality of periodic frames of time slots of which each of said frames comprises a service slot for only service bits and a plurality of customers slots for customer bits and a lesser number of service bits, and said improvement comprising: a first plurality of encoding means each incorporated in said primary unit and respectively corresponding to said first data streams and each operable on the corresponding first stream to generate in each of the frames therein both a synchronizing pattern of reserved service bits comprising a sequence of synchronizing bits in the service slot of such frame and, also, a spoiler pattern of reserved service bits comprising spoiler bits in customer slots of such frame, said spoiler pattern being interrelated with said synchronizing pattern to preclude any bit sequence present in the last named stream and including any customer bit from duplicating said synchronizing pattern, a first plurality of decoding means incorporated said primary unit and respectively corresponding to said second data streams and operable to detect the binary values of the bits therein, each such decoding means in said first plurality thereof being responsive to and only to detection thereby of the presence in the corresponding second data stream of a full synchronizing pattern to produce a synchronizing signal utilized by the primary unit, a second plurality of encoding means respectively corresponding to and incorporated said secondary distribution units and operable in the same manner as said encoding means in said first plurality thereof to generate synchronization and spoiler patterns in the second data streams transmitted from said secondary units to said primary unit, and a second plurality of decoding means respectively corresponding to and incorporated in said secondary distribution units and each operable in the same manner as said decoding means in said first plurality thereof to be responsive to and only to the presence of a full synchronizing pattern in the first data stream reaching the secondary distribution unit corresponding to that decoding means to produce a synchronizing signal utilized by that secondary distribution unit.

11. A method of introducing synchronizing information into a time division multiplex data stream constituted of periodic consecutive binary bits and having the format of a plurality of periodic frames of time slots of which each frame comprises a service slot for service bits only and a plurality of customer slots for customer bits and for a lesser number of service bits, said method comprising, generating in each of said frames in said stream a synchronizing pattern comprising a sequence of reserved synchronizing bits in said service slot, and further generating in each such frame a spoiler pattern of reserved service bits comprising spoiler bits in said customer slots, said synchronizing pattern and spoiler pattern being interrelated to preclude any bit sequence present in said stream and including any customer bit from duplicating such synchronization pattern.

12. Apparatus comprising, a circuit card usable in equipment in a telecommunications network for conveying information of customers thereof, circuitry on said card to receive and process data and to forward it in the form of an outgoing time division multiplexer stream of periodically recurring consecutive binary valued digital bits, said stream having the format of periodic flames of time slots of which each frame consists of a service time slot comprising service bits, and, also, of a plurality of customer time slots each consisting of customer bits for carrying customer information and of a lesser number of service bits, and encoding means mounted on said card and in the form of a semiconductive integrated circuit, said encoding means being responsive to local synchronizing signals derived from said received data to generate in said stream both a synchronizing pattern comprising the binary values of a sequence of service bits in said service slot and reserved for such pattern and, also, a spoiler pattern comprising the binary values of a plurality of spoiler service bits which are respectively distributed over and included in said plurality of customer slots and are reserved for said spoiler pattern, said synchronous pattern and spoiler pattern being interrelated to prevent any bit sequence in said stream which includes any customer bit from fully duplicating said synchronization pattern.

* * * * *